UNITED STATES PATENT OFFICE.

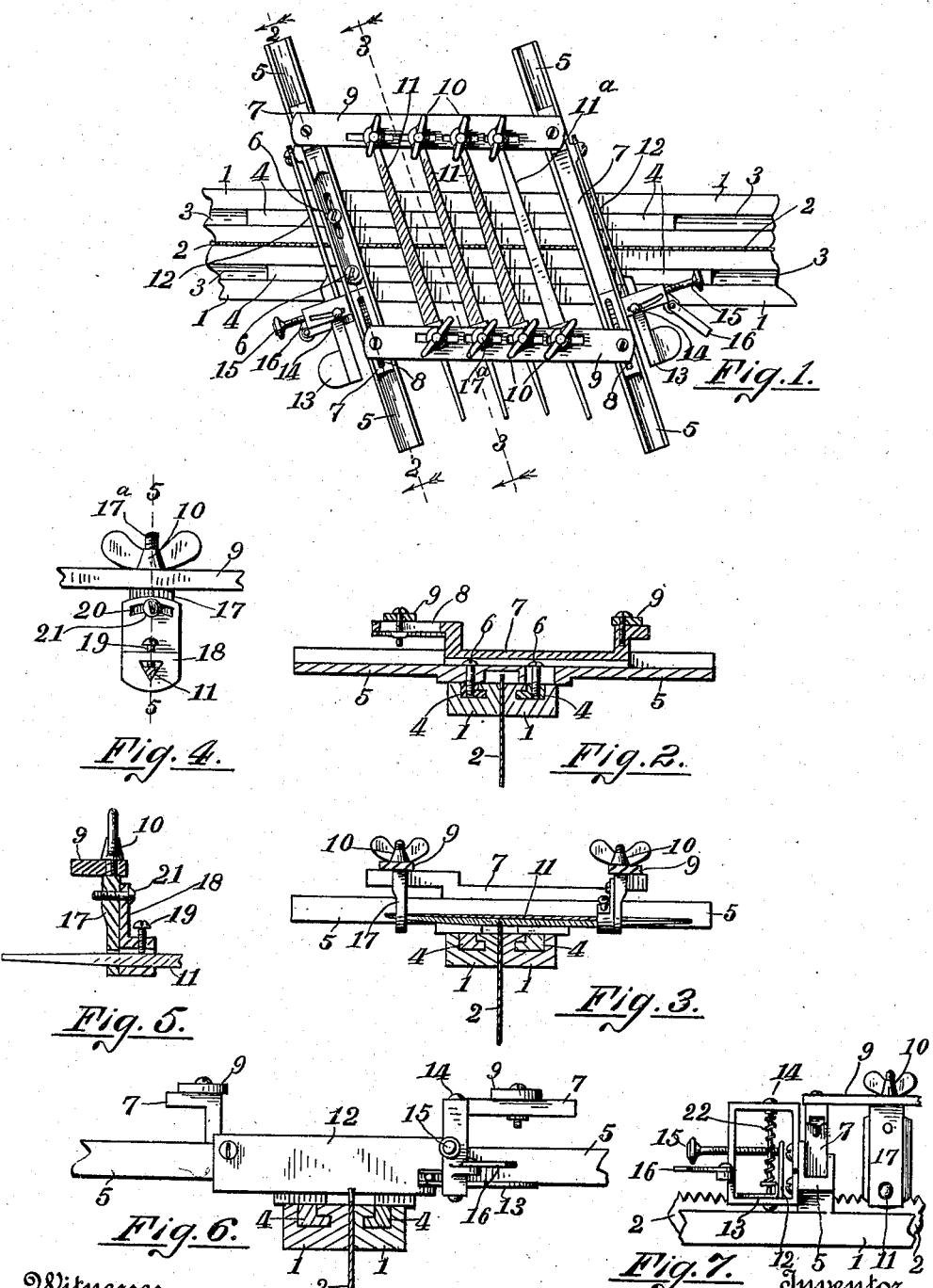

RICHARD E. BLANKENBURG, OF GRAND RAPIDS, MICHIGAN.

SAW-FILING DEVICE.

No. 924,134.    Specification of Letters Patent.    Patented June 8, 1909.

Application filed October 26, 1908. Serial No. 459,603.

*To all whom it may concern:*

Be it known that I, RICHARD E. BLANKENBURG, a citizen of the United States of America, residing at Grand Rapids, in the county of Kent and State of Michigan, have invented certain new and useful Improvements in Saw-Filing Devices; and I do hereby declare the following to be a full, clear, and exact description of the invention, such as will enable others skilled in the art to which it appertains to make and use the same.

My invention relates to saw filing devices and its object is to provide a device that will operate to file a saw so that the teeth will be uniform and exactly alike and that will automatically remove any irregularity in the length or form of the teeth, to provide improved means for adjusting the carriage step by step longitudinally of the saw, and to provide the same with various new and useful features hereinafter more fully described and particularly pointed out in the claims, reference being had to the accompanying drawings in which:

Figure 1 is a plan view of a device embodying my invention; Fig. 2 a transverse section of the same on the line 2—2 of Fig. 1; Fig. 3 the same on the line 3—3 of Fig. 1; Fig. 4 a detail in elevation of one of the hangers for holding the file; Fig. 5 a section of the same on the line 5—5 of Fig. 4; Fig. 6 a detail in end elevation; and, Fig. 7 the same at right angles to Fig. 6.

Like numbers refer to like parts in all of the figures.

1—1 represents a pair of clamping jaws provided with means for forcing the same toward each other, not shown. 2 a saw clamped therebetween. In these jaws 1 are parallel grooves or channels 3, one in each, and spaced apart, in which grooves are slides 4 movable parallel with the saw. Mounted upon the slides and extending above the saw are ways 5. These ways being pivotally connected with the slides by pivoting and clamping screws 6 whereby the ways may be adjusted at various angles transversely of the saw. These ways are spaced apart and parallel and in them is mounted a carriage consisting of slides 7 movably traversing the saw in said ways to which slides are attached bars 9 by pivot screws extending through slots 8 in the slides whereby the bars 9 may be adjusted toward and from each other for various lengths of files. These bars 9 are slotted longitudinally at intervals and in each slot is the shank 17$^a$ of a hanger 17 and provided with a thumb nut 10, whereby the hanger is adjustably secured to the bar 9. In the lower end of each hanger 17 is an opening to receive the respective end of a file and support the same.

To adjust the file about its longitudinal axis, an adjusting plate 18 is provided having an opening therein to receive the file and provided with a screw 19 to secure the file in place therein. This plate 18 is provided with a slot 20 concentric with the axis of the opening and a clamping screw 21 extends through said slot and into the hanger 17, whereby the plate is held adjusted about the axis of the opening, and holds the file in adjusted position.

To move the device step by step longitudinally of the saw and accurately adjust the same to successively operate upon the saw, a flexible plate 12 is attached to each of the ways 5 and normally extends parallel therewith. This plate is pivotally secured at one end, and provided with a thumb piece 13 at the other end, to manually operate the same. By raising the free end of this plate and moving the same away from the way, it will pass over one or more of the saw teeth and can be dropped between two of the same. To limit this movement, I provide an adjustable stop in the form of a screw 15, and to depress the plate and insure proper adjustment at the bottom of the space between the teeth of the saw, I provide a spring 22 to depress the thumb piece, in the axis of which spring, is a guide pin 14. To put one of these plates 12 out of action, while the other is being used, or for any other purpose, I provide a pivoted arm 16 which can be swung beneath the thumb piece 13, thus holding the plate in elevated position.

I prefer to use a number of files 11 and to further insure proper maintenance of the position of the device relative to the saw, one of the said files 11$^a$ is made smooth and serves as a guide by engaging the saw between two of the teeth thereof.

In operation, the saw is first adjusted in the clamps by placing the same in engagement with the files. And the files are adjusted by adjusting the hangers in the bar 9; adjusting the slotted plates 18 on the hangers, and by turning the ways 5 to the proper angle across the saw, the parts being secured by tightening the screws 6, 10, and 21. By manually reciprocating the carriage supporting the files, the same will be accurately guided and will necessarily produce exact and uniform teeth. By turning the plate 12 forward and reëngaging it with another space between the saw teeth, the carriage will be moved upward on its pivot and thence forward step by step and adjusted properly to engage the files with the teeth of the saw in succession.

What I claim is:—

1. A saw filing device comprising laterally adjustable ways, a longitudinally reciprocable carriage in the ways, files supported by the carriage, a plate pivoted at one end to the ways to turn in a vertical plane and movable laterally at the other end and also adapted to engage the teeth of a saw at its lower edge to adjust and hold the ways.

2. A saw filing device comprising a pair of jaws adapted to hold a saw, ways adjustable longitudinally of the jaws, a carriage in the ways reciprocable transversely of the jaws, a vertically rigid and laterally flexible plate pivoted at one end to the ways to turn vertically and adapted to enter between the teeth of a saw at its lower edge, a spring to depress the plate, and a pivoted arm to support the plate when out of action.

3. A saw filing device, comprising a pair of jaws adapted to hold a saw, ways adjustable longitudinally of the jaws and extending across the same, a carriage slidable in the ways, files attached to the carriage, a flexible plate pivotally attached to the ways at one end and both vertically and laterally movable at the other end, an adjustable stop to limit the lateral movement of the plate, and a thumb piece on the plate to operate the same.

4. A saw filing device, comprising a pair of jaws adapted to hold a saw, ways arranged transversely of the jaws and adjustable longitudinally thereof, a carriage slidable in the ways, files supported by the carriage, a flexible plate pivotally attached to the ways at one end and having a thumb piece at the other end, a spring to depress the plate, an adjustable stop to limit the lateral movement of the plate, and a pivoted arm to engage the thumb piece and hold the plate in elevated position.

In testimony whereof I affix my signature in presence of two witnesses.

RICHARD E. BLANKENBURG.

Witnesses:
L. V. MOULTON,
GEORGIANA CHACE.